United States Patent
Kidd

[11] 3,876,159
[45] Apr. 8, 1975

[54] FORAGE HARVESTERS

[76] Inventor: Archibald Watson Kidd, Seend Close, Seend, Melksham, Wiltshire, England

[22] Filed: Dec. 27, 1973

[21] Appl. No.: 428,816

Related U.S. Application Data
[62] Division of Ser. No. 352,979, April 20, 1973.

[30] Foreign Application Priority Data
Apr. 25, 1972 United Kingdom............ 19238/72

[52] U.S. Cl. .................... 241/32; 56/294; 241/55; 241/222; 241/289; 241/293
[51] Int. Cl. .................... B02c 18/06; B02c 23/04
[58] Field of Search................ 241/32, 55, 221–225, 241/237, 239–241, 285 R, 289, 292, 293; 56/249, 294

[56] References Cited
UNITED STATES PATENTS

| | | | |
|---|---|---|---|
| 1,365,228 | 1/1921 | Davidson | 241/225 |
| 1,758,702 | 5/1930 | Jacobson | 241/55 X |
| 2,172,886 | 9/1939 | Gabel | 241/224 |
| 2,216,612 | 10/1940 | Dimm et al. | 241/237 |
| 2,538,359 | 1/1951 | Ferrell | 56/294 |
| 3,126,931 | 3/1964 | Blanshine et al. | 241/55 |
| 3,144,745 | 8/1964 | Sharps | 56/294 X |
| 3,357,467 | 12/1967 | Morfoski | 241/32 |
| 3,380,501 | 4/1968 | Hoch | 241/55 |
| 3,473,742 | 10/1969 | Montgomery | 241/32 |
| 3,511,444 | 5/1970 | Vitez | 241/32 |

*Primary Examiner*—Granville Y. Custer, Jr.
*Assistant Examiner*—Howard N. Goldberg

[57] ABSTRACT

Cutting rotor for a forage harvester in the form of a plurality of blades mounted between two end plates each blade having a nick or groove in at least one surface so that on impact with a hard object the blade will break at the nick and thus reduce damage to the rotor. The blades have aerofoil sections at their inner edges and the end plates are scalloped between the blades to give improved air flow. The blades operate against a stationary ledger plate which is adjustable and is also movable under abnormal shock conditions and the casing for the rotor is of variable thickness so that if a hard object is drawn into the machine, damage is confined to those parts of the casing which are most easily replaced.

10 Claims, 6 Drawing Figures

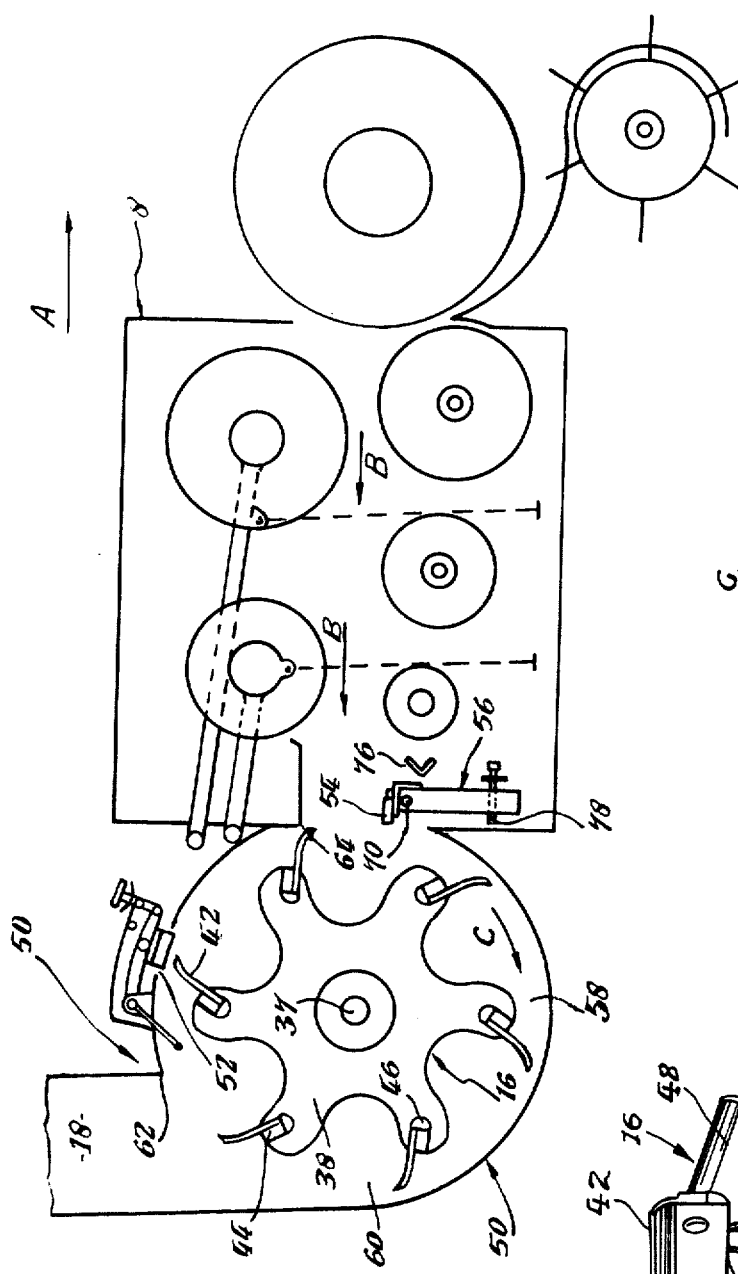
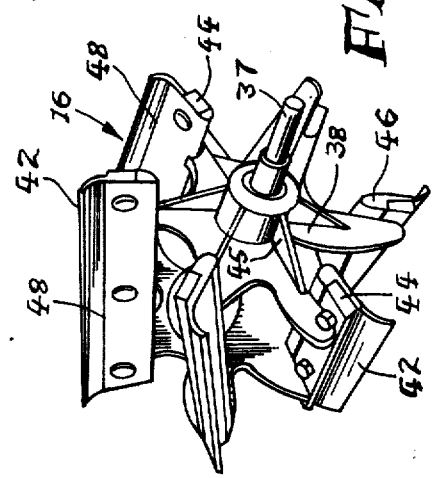
Fig. 1.
Fig. 2.

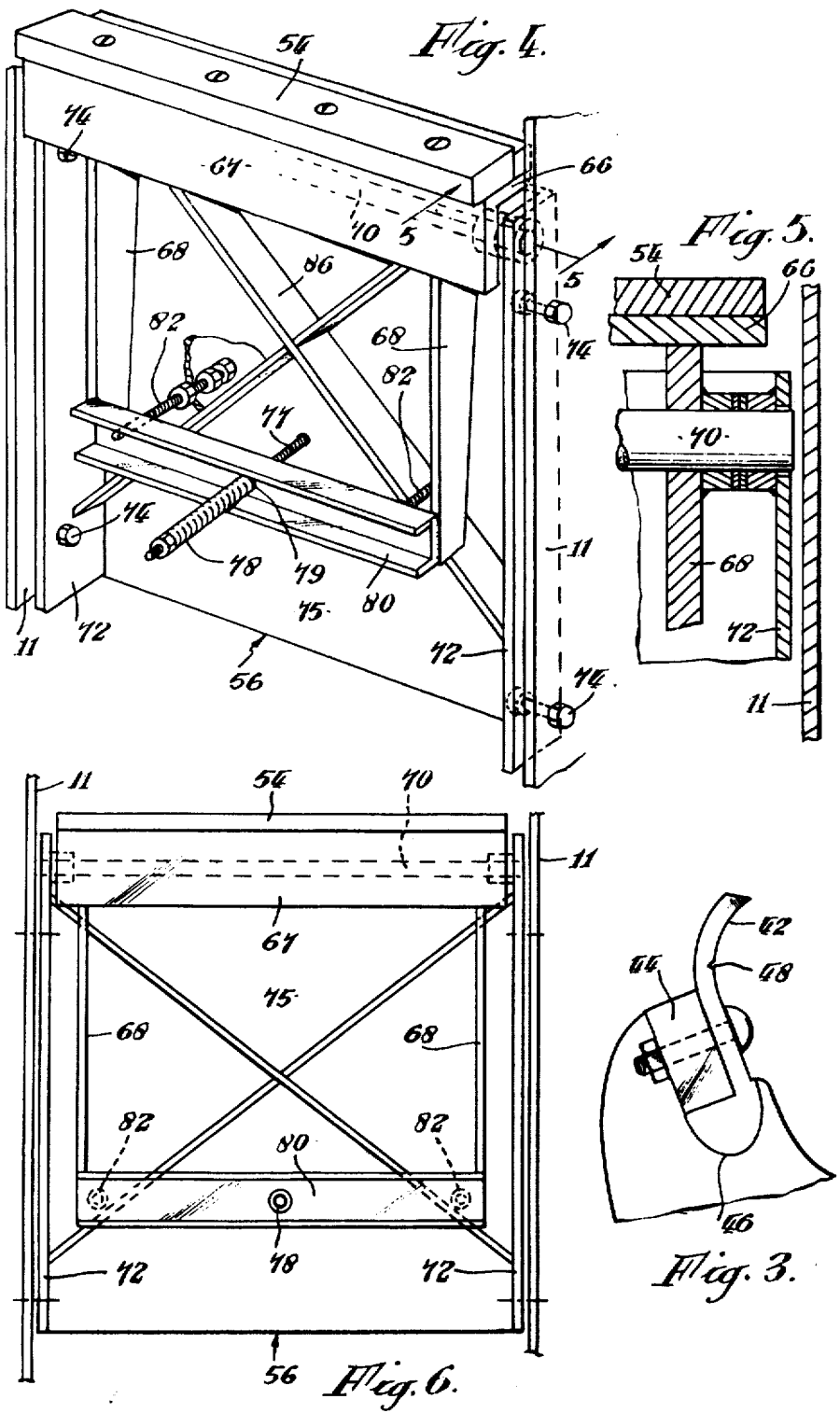

FORAGE HARVESTERS

This application is a division of my co-pending application Ser. No. 352,979, filed Apr. 20, 1973.

This invention relates to forage harvesters and other machines of the kind which employ a chopping rotor to cut a crop fed into it. Such a rotor has blades mounted on its periphery, and when in motion the blades describe a cylinder. Machines of this type employ a stationary ledger plate against which the rotating blades cut.

A problem with machines of this type is that solid objects, for example large stones or pieces of scrap metal, which are lying in a field can be picked up and fed into the chopping mechanism. Under such circumstances considerable damage can be caused to the machine. It is an object of this invention to provide a machine wherein such damage will be much minimized.

According to one aspect of this invention there is provided a cutting rotor for a forage harvester or like machine, said rotor comprising blade supporting means adapted to be rotatably driven and a plurality of blades mounted thereon by mounting means. Each blade has a nick in at least one surface, between the mounting means and the cutting edge of the blade, so that on impact the blade will break at said nick and thus reduce damage to the rotor. The blades are easily replaced.

The term "nick" as used herein embraces within its scope a groove.

According to another aspect of this invention there is provided a forage harvester having a cylindrical cutting rotor with blades which operate against a ledge plate wherein the ledger plate is mounted on one part of a two part ledger plate assembly the said one part being pivoted on an axis parallel to the ledger plate to the other part whereby the gap between the ledger plate and the cutting blades may be adjusted.

In order that the invention may be understood more readily, an embodiment will now be described with reference to the accompanying drawings, wherein:

FIG. 1 is a side elevation of part of a forage harvester;

FIG. 2 is a perspective view of the cutting rotor of the harvester;

FIG. 3 is a detail view of one blade and its mounting;

FIG. 4 is a perspective view of the ledger plate assembly of the harvester;

FIG. 5 is a section of FIG. 4 along the line 5—5 and FIG. 6 is a rear elevation of the ledger plate assembly.

Referring to the drawings, and particularly to FIG. 1 the harvester travelling in the direction of the arrow A picks up a cut crop and compresses it while it is passed through a feed chamber 8 in the direction of the arrow B. It is then passed into the rear chamber 50 in which is mounted the chopping rotor 16, driven from the power take off shaft of the towing tractor.

The chopping rotor 16 is fixedly mounted on a shaft 37 which is driven in the direction of the arrow C from the power take off shaft of the towing tractor. The rotor 16 includes two spaced apart cheek plates 38 which between them carry six blade supporting cross bars 44 arranged in a helical pattern to the front of which bars are bolted chopping blades 42. The cheek plates 38 are heavily scalloped away between points of attachment of the blades so as to allow free ingress of air from either end of the rotor to its central part. Each cheek plate is supported axially by six radial gusset plates 45.

The blades 42 have a forward lead at the cutting surface and the inner edge of each blade is provided with an aerofoil section 46 underneath the supporting bar 44 best seen in FIG. 3.

To prevent excessive damage caused by solid material being fed into the chopping rotor 16 the cutting blades 42 have each a slight nick 48 rolled into one or both of their faces, along the whole length of the blade and at a point just adjacent to the supporting bar 44. In this way a blade can break off fairly easily under shock stress and relieve the enormous forces which would otherwise be generated.

The chopping rotor 16 operates inside the generally cylindrical casing 50 in which there are openings for the entry and exit of the crop, and also an opening 52 for a sharpening device for the blades of the rotor. To cut the crop, the blades 42 co-operate with a ledger plate 54 which forms part of a ledger plate assembly 56 described in greater detail later. The casing 50 is formed of relatively thin sheet metal in the region between the ledger plate 54 and the lowest point of the casing indicated at 58, of thicker metal in the region between point 58 and the start of the exit chute 18 at 60, and of still thicker metal in the regions lying generally above the rotor, between the points 62 and 64. In the event of a hard solid object being drawn into the machine, damage to the casing 50 is likely to be confined to the thinnest section (which is also likely to receive the initial impact), or perhaps to the two sections below the rotor. These are accessible and easily replaced, while the sections above the rotor, which are least accessible for repair, are of the thickest material and thus least likely to be damaged. Moreover, deformation of the thinnest plate may absorb much of the momentum imparted to a stone or the like through collision with the rotor.

The blades 42 operate against a ledger plate 54 forming part of a ledger plate assembly 56. The position of this assembly in the machine is best seen from FIG. 1, but the construction of the assembly is illustrated by FIGS. 4, 5 and 6.

The ledger plate assembly 56 has two main parts. One part is formed by the ledger plate 54 itself and its supporting frame. This frame is formed by two vertical members 68 rigidly attached at their upper end portions to an L-shaped member 67 and at their lower end portions to a cross bar 80. The ledger plate 54 is secured to the horizontal limb of the L-shaped member 67.

The second main part of the ledger plate assembly is a pivot support plate which is U-shaped in cross-section, having a back 75 and flanges 72. The back 75 is reinforced with ribs 86 to prevent buckling.

The vertical members 68, and hence the whole first part of the ledger plate assembly, are pivotally carried by a pivot bar 70. This bar is carried between the flanges 72 of the U-shaped pivot support plate. The flanges 72 are bolted to the sides 11 of the feed chamber by shear bolts 74, whose functions will be described in greater detail later.

In normal operation, as the first part of the ledger plate assembly makes limited pivoting movement about the pivot bar 70, the ledger plate 54 is moved towards or away from the path of the chopping blades 42, the vertical members 68 carrying the ledger plate are biased from the back 75 of the support plate by means of compression spring 78 surrounding a pin 77 projecting from an aperture 79 in the cross bar 80. Such motion is limited by adjustable set screws 82 movable in tapped holes in the back 75 of the support plate.

As the set screws 82 are adjusted, the pivotal position of the first part of the ledger plate assembly relative to the second part (the U-shaped pivot support plate) is adjusted and hence the gap between the ledger plate 54 and the path of the blades 42 is adjusted.

It will be appreciated that the first part of the ledger plate assembly is supported in its operational position solely from the second part of the assembly. The second part of the assembly is held to the machine by shear bolts 74 as already stated. The bolts 74 are of size and material chosen to withstand the stresses produced in normal operation of the machine, but to shear if a hard solid object gets between a blade 42 of the chopping rotor 16 and the ledger plate 54. The whole assembly will then drop, minimising damage to the rotor and to the ledger plate. The sliding plate is made of sufficient vertical depth in proportion to the width of the ledger plate that when the assembly drops, it is unlikely to twist in a generally vertical plane and become jammed in more or less its operative position. In any case, the sliding pivot plate should be of a vertical depth at least comparable with the width of the ledger plate, say at least three-fourths of the width of the ledger plate 54. As best seen in FIG. 1, a relatively heavy bar 76 is mounted between the side walls 11 of the feed chamber, between the ledger plate assembly 56 and other parts contained in the feed chamber so that if and when the bolts 74 shear, the ledger plate assembly 56 cannot be thrown forward into these parts.

What I claim and desire to secure by Letters Patent is:

1. Cutting rotor for a forage harvester or like machine, said rotor comprising blade supporting means, adapted to be rotatably driven and a plurality of blades each having an inner edge, an outer cutting edge and a pair of surfaces extending therebetween, said blades being mounted to said blade supporting means by mounting means, each blade having a nick or groove in at least one said surface, said nick or groove being inwardly spaced from said outer cutting edge, so that on impact the blade will break at the said nick or groove and thus reduce damage to the rotor.

2. Cutting rotor according to claim 1 wherein the said nick or groove runs parallel to said outer cutting edge of the blade.

3. Cutting rotor according to claim 1 wherein the blade supporting means comprises two spaced apart cheek plates, the said plates being scalloped between at least some of the blades.

4. Cutting rotor according to claim 1 wherein an aerofoil section is provided at the inner edge of each blade.

5. Forage harvester according to claim 1 wherein the said blades operate against a stationary ledger plate, means being provided for adjusting the distance of the said plate from the cutting blades and for moving the ledger plate under abnormal shock conditions.

6. Forage harvester according to claim 5, wherein the ledger plate is mounted on one part of a two part ledger plate assembly, the said one part being pivoted on an axis parallel to the ledger plate to the second part and secured only to said second part, means being provided for adjusting the position of said first part relative to said second part, whereby the gap between the ledger plate and the path of the cutting blades may be adjusted, said second part being mounted to the machine by means releasable under abnormal shock condition, the entire ledger plate assembly being operable to be displaced under abnormal shock conditions.

7. Forage harvester or like machine according to claim 6 wherein the second part of the ledger plate assembly is fixed to the machine by shear bolts.

8. Forage harvester or like machine according to claim 6 wherein the means for adjusting the position of the first part relative to said second part comprises a spring tending to urge the first part to bring the ledger plate towards the cutting blades and an adjustable stop for limiting the movement of the said spring.

9. Cutting rotor according to claim 1, wherein the blade supporting means comprises two spaced apart cheek plates with supporting cross bars attached thereto, the blades being attached one to each said supporting cross bar, and each blade has an airfoil section of streamlined shape disposed radially inwardly of each blade and its associated supporting cross bar.

10. Forage harvester having a cutting assembly comprising
 a. cylindrical cutting rotor having two spaced apart cheek plates with a plurality of cutting blades mounted thereon and means for rotatably driving the cheek plates, each said blade having a nick or groove in at least one surface, parallel to but spaced from the cutting edge
 b. ledger plate assembly against which the blades operate, said assembly comprising a first part including a ledger plate and ledger plate supporting members, a second part including a pivot member on which the said first part is pivotally carried said pivot member running parallel with the said ledger plate, spring means bearing on the ledger plate supporting members and tending to urge the ledger plate towards the path of the cutting blades and an adjustable stop to limit the movement of the ledger plate towards the path of the cutting blades, the said second part being fixed to the machine by shear bolts
 c. a casing for the cutting assembly comprising plates of varying thickness, the most accessible and easily replaced plates being made of thinner material than those less easily replaced.

* * * * *